United States Patent [19]

von Benda et al.

[11] Patent Number: 4,867,857

[45] Date of Patent: Sep. 19, 1989

[54] METHOD FOR THE MANUFACTURE OF CATALYST ELECTRODES WITH STRUCTURALLY CONNECTED CARRIER BODIES AND SUITABLE CATALYST SUSPENSIONS

[75] Inventors: Klaus von Benda, Nuertingen; Guenter Gutmann, Esslingen; Hans-Joachim Hildner, Stuttgart, all of Fed. Rep. of Germany

[73] Assignee: Deutsche Automobilgesellschaft mbH, Hanover, Fed. Rep. of Germany

[21] Appl. No.: 167,721

[22] Filed: Mar. 14, 1988

[30] Foreign Application Priority Data

Mar. 14, 1987 [DE] Fed. Rep. of Germany ....... 3708296

[51] Int. Cl.$^4$ ............................................. C25B 11/00
[52] U.S. Cl. .................... 204/290 R; 204/291; 204/293; 427/241; 427/347; 502/101; 502/301; 429/27; 429/29; 429/42; 429/44
[58] Field of Search ............... 427/241, 347; 502/101, 502/301; 204/290 R, 291, 292, 293; 429/27, 29, 42, 44

[56] References Cited

U.S. PATENT DOCUMENTS

| | | | |
|---|---|---|---|
| 1,252,005 | 1/1918 | Hess | 427/241 |
| 2,011,135 | 8/1935 | Austin | 427/347 |
| 3,480,538 | 11/1969 | Sturm | 204/290 R |
| 3,556,856 | 1/1971 | Elbert | 136/86 |
| 3,943,006 | 3/1976 | Baker et al. | 136/120 |
| 4,148,942 | 4/1979 | Gierek jet al. | 427/347 |
| 4,250,235 | 2/1981 | DuPont et al. | 429/211 |
| 4,301,218 | 11/1981 | Benczur-ürmössy | 429/42 |
| 4,585,711 | 4/1986 | Vaidyanathan | 429/42 |
| 4,743,349 | 5/1988 | Bachot et al. | 204/290 R |

OTHER PUBLICATIONS

Journal of Applied Physics 53 (1982) 10, 6979–6982.
T. Kenjo, Bull. Chem. Soc. of Japan, 54 (1981), pp. 2553–2556.

*Primary Examiner*—John F. Niebling
*Assistant Examiner*—Kathryn Gorgos
*Attorney, Agent, or Firm*—Barnes & Thornburg

[57] ABSTRACT

A method for the manufacture of catalyst electrodes with structurally connected carrier bodies, in which an excess of catalyst suspension is applied to the surface of the carrier body which thereafter is centrifuged off by rotation of the carrier body about an axis disposed perpendicularly to its surface. An aqueous suspension with Raney nickel as catalyst, which is particularly suitable as an example for the use in the coating method, has a dynamic viscosity of 10,000 to 50,000 mPa . s at a temperature of 20° C. as well as a solids content of 55 to 75% by weight. An extraordinarily uniform coating can be acheived with the method of the present invention.

40 Claims, No Drawings

METHOD FOR THE MANUFACTURE OF CATALYST ELECTRODES WITH STRUCTURALLY CONNECTED CARRIER BODIES AND SUITABLE CATALYST SUSPENSIONS

BACKGROUND AND SUMMARY OF THE INVENTION

The present invention relates to a method for the manufacture of catalyst electrodes, especially to a method for the shaping of the catalyst layer on a carrier body.

Catalyst electrodes consist at least of a current-conducting catalyst carrier and of an active catalyst layer which is the location of the electro-chemical reaction. Gas diffusion electrodes, which convert gaseous reactants, for the most part additionally carry on the gas side a hydrophobic cover layer. For example, metal wire meshes, apertured plates, expanded metals, open-pored metal foam bodies or fiber frameworks serve as catalyst carriers. The catalyst layers ar applied on these substrates.

Prior art methods are the pressing-on (technically for the most part carried out by rolling) of binder-containing catalyst powder bulk materials (see, for example, DE-PS No. 23 02 867) or pre-rolled webs (DE-OS No. 29 41 774) on metal mesh substrates; also made by rolling are fluid-containing, dough-like pastes of catalyst, of binder and of a non-aqueous fluid, possibly with the addition of a pore-former (U.S. Pat. Nos. 3,943,006; 4,585,711), or aqueous pastes of catalyst and of a PTFE-dispersion which contain a surfactant (T. Kenjo, Bull. Chem.Soc.Jpn. 54. (1981), 2553–1556). Further customary methods are the sedimentation of aqueous suspensions of the catalyst on meshworks whereby the suspension may contain hydrophobic and/or hydrophilic additional substances as well as filtering assist agents (DE-PS No. 27 20 529, DE-OS No. 16 71 446, DE-AS No. 20 37 795), the screen printing of aqueous catalyst pastes on substrate and hydrophobic cover layer (U.S. Pat. No. 4,250,235, column 4, first paragraph), the spraying-on or applying with a doctor knife of aqueous, catalyst suspensions containing thickening agents on (bi-) porous nickel plates (U.S. Pat. No. 3,556,856). Insofar as the binder is PTFE, a heat treatment for the sintering and distribution of the PTFE frequently follows the shaping.

However, these manufacturing processes are relatively costly because the working conditions for achieving uniform and reproducible results must be maintained very accurately and, in part, also a considerable mechanical expenditure is necessary.

The object of the present invention resides in providing a simple method which can be carried out rapidly for the manufacture of catalyst electrodes with structurally connected carrier bodies, which therebeyond entails additionally excellent reproducible results. A further object of the invention resides in the development of a catalyst suspension particularly suitable for this method.

The underlying problems are solved with a method of the aforementioned type in that an excess of the suspension is applied on the surface of the carrier body and the excess is centrifuged off by rotation of the carrier body about a real or imaginary axis disposed perpendicularly to its surface. The application of the excess can take place in the most varied ways. Particularly simple and therefore, preferred is an immersion or dipping of the carrier body in the suspension or a pouring on of the suspension on the surface of the carrier body. With carrier bodies which are to be provided with a catalytic layer only on one side, one contacts only the surface of the suspension with the carrier body surface to be coated. However, it is also possible to press two carrier bodies to be coated only on one side areally against one another and to immerse or dip the thus-formed body in the catalyst suspension. In that case, only the outwardly disposed areas are coated and after the separation of the two parts, two catalyst electrodes are then available which are coated only on one side. In particular in case of catalyst electrodes having larger dimensions which are to be manufactured of circular shape, it is advantageous to arrange the carrier bodies to be coated on a shaft extending through the center point of the circle. The carrier bodies then only have to be partly immersed into the suspension either at right angle or at an inclination to the suspension surface and can be coated completely by slow rotation about the axis. The advantage of this coating method resides above all in that only a slight quantity in suspension must be provided in the coating container. The carrier bodies to be coated can be coated with the suspension individually or at spacings in multiples retained in a suitable mounting device. With the described preferred coating methods, the coating with the catalyst suspension takes place practically always with excess, i.e., the applied catalyst layer is thicker than the layer necessary for the catalyst electrode.

The excess in catalyst suspension is centrifuged off after the application by rotation of the carrier body. The rotation can thereby take place about a shaft passing through the carrier body as also about an axis located outside of the rotary body, for example, if the electrode is fastened at the arm starting from a shaft. The adhesion of the catalyst layer on the carrier body is enhanced by a slight penetration of the suspension into the carrier body because a very good mechanical connection between layer and carrier body takes place as a result thereof. The depth, up to which the catalyst suspension penetrates into the carrier body, depends with predetermined paste viscosity on the time during which the excess in suspension is maintained. Time periods between two and ten seconds have thereby proved as favorable. With shorter periods of time, the wetting of the substrate may not be sufficiently uniform under some circumstances whereas with longer periods of time, especially with very thin carrier bodies, an excessively large proportion of the carrier body is filled out by the suspension. However, in general, the coating of the carrier body takes place for such length of time that the mentioned time periods can be maintained effortlessly.

The centrifuging of the excess catalyst suspension takes place with such a rotational speed that the desired layer thickness for the catalyst layer is produced. Customarily, a centrifuging period of time of two to ten seconds is sufficient at a rotational speed of 200 to 2,000 rpm. Thin coatings and/or a high viscosity of the suspension require longer centrifuging periods, respectively, higher rotational speeds. Appropriately the centrifuging of the excess catalyst suspension takes place over the vessel in which the coating is carried out. The centrifuged-off suspension thereby returns directly into the coating vessel and is again available for the next coating operation. After the removal of the excess suspension by centrifuging, the catalyst electrode only has to be dried additionally in a manner known as such, for example, at a temperature of about 80° C. and is then ready for use.

No particular requirements are made of the carrier body as regards its properties. In principle, roughened or wafered apertured plates or meshworks satisfy the requirements. The surface of the substrate must have a roughness sufficient for the adhesion, and the porosity must be sufficiently great for the gas removal. However, preferred for weight reasons are metal fiber bodies with porosities over 80% or metallized plastic fiber frameworks. They combine high conductivity with good adhesion of the applied catalyst layer.

The advantages achievable with the method of the present invention reside, above all, in that with a single operating step and with a uniform technique, both a substrate coated on one side as well as a substrate coated on two sides can be manufactured. The layer thicknesses of the catalytically active layers are extraordinarily well reproducible, and the layer possesses a high surface quality without having to use mechanical abrasion-endangered assists such as wipers, doctor blades, rollers or the like. Furthermore, the method of the present invention is also particularly suitable for the manufacture of circularly shaped electrodes which according to the prior art methods could only be manufactured with difficulty or with acceptance of waste. Furthermore, the method of this invention utilizes optimally the catalyst paste because the centrifuged-off paste excess is again usable without carrying out any special measures.

The shaping technique according to the present invention finds particularly advantageous application in the manufacture of hydrogen-catalyst electrodes for nickel/hydrogen cells. In the course of the simplification of the manufacture and construction of such cells, one has gone to connecting the catalyst layer tightly with the diffusion body without separate carrier. The diffusion body customarily consisting of plastic woven materials or meshworks is replaced for that purpose by a light-weight, metallized plastic fiber framework which combines the function of the catalyst carrier and of the diffusion body. Furthermore, the expensive noble metals are replaced by less costly catalytic-active substances, for example, nickel and nickel alloys, especially Raney nickel. Catalyst electrodes are thereby used in which the diffusion body carries a catalyst layer only on one side as also those in which the diffusion body is connected on both sides with a catalytically active layer. Such catalyst electrodes are described, for example, in the DE-PS No. 28 35 503.

For the application of the more advantageous forming method according to the present invention, a catalyst suspension with properties matched to the catalyst and to the method had to be developed. It will be described hereinafter in a typical example.

Paste-like catalyst suspensions which are particularly suitable for the coating method of this invention possess a dynamic viscosity of 10,000 to 50,000 mPa·s, with reference to a shear velocity of $D = l \cdot s^{-1}$ and a temperature of 20° C., and a solids content of 55 to 75 % by weight. The dynamic viscosity was measured with a rotary viscosity meter Haake RV 12, measuring system SV II and converted to the shear velocity $D = l \cdot s^{-1}$. As the double logarithmic plotting of the dynamic viscosity Eta ($\eta$) versus the shear velocity D for pseudoplastic pastes produces a straight line, the dynamic viscosity for $D = l \cdot s^{-1}$ can be readily extrapolated. Depyrophorized Raney nickel is used as catalyst material. Water, but also organic solvents may be used as suspension material, whereby water is naturally preferred. For fixing the catalyst particles, the suspension always additionally contains also a binding agent. This binding agent must bind the catalyst layer without significantly impairing its electrical conductivity. It must, therefore, act in small additive quantities and additionally must be stable in the electrolyte. A large number of such binding agents are known which in general also act as thickening agent for the suspension. This involves generally polymers such as methyl cellulose, carboxymethyl cellulose, cross-linked starch, polyvinyl alcohol, polyvinyl-pyrrolidone, polyethylene oxide, polyacrylic acid and the like. As long-chain polymers, they also influence the paste rheology, which can be utilized for the adjustment of a desired flow behavior of the catalyst suspension. Methylcellulose, polyvinyl-pyrrolidone and polyethylene oxide or mixtures thereof have proved as particularly suitable, which are to be present in the suspension in quantities of 0.1 to 2% by weight. Particularly suitable is polyethylene oxide with a molecular weight of 600,000 or larger (max. approximately 5 millions). The catalyst layer further contains in a known manner a hydrophobizing agent whereby fluorocarbon resins, especially polytetrafluoroethylene are preferred as hydrophobizing agents. Polytetrafluoroethylene is added to the catalyst suspension in quantities of about 2 to 5% by weight in the form of a dispersion. Such dispersions are commercially available and contain customarily a small amount of a non-ionic surfactant as auxiliary agent.

The solids content, i.e., the content in catalyst particles and hydrophobizing agent is to amount approximately to 55% to 75% by weight. Preferred is a content in catalyst particles in the solution of about 60 to 70% by weight. The quantity in binding or thickening agent is so selected that the desired viscosity is reached. With inadequate viscosities, the catalyst suspensions have a tendency for the settling of the particles, with excessive viscosities, the flow capability is inadequate which leads to a poor loadability of the diffusion body with the catalyst suspension and to a rough and non-uniform coating.

Some typical examples of the present invention are as follows:

EXAMPLE 1

A. Manufacture of the Catalyst Suspension

For the manufacture of a catalyst suspension with relatively high viscosity for coating vertically arranged diffusion bodies, 200 g Raney nickel (stabilized, titanium doped, bulk density 2.4 g per cm$^3$) are added in a vessel of stainless steel and about 0.5 l capacity with 40 cm$^3$ of water as well as 8.8 cm$^3$ of a polytetrafluoroethylene dispersion (commercial product, 0.9 g polytetrafluoroethylene per cm$^3$, with 5% by weight of non-ionic surfactant, in reference to the solids content) and are stirred until the mass is viscous and kneadable. Thereafter, 40 cm$^3$ water and 1.5 g polyethylene oxide (commercial product, average molecular weight 4 millions) were further added, briefly stirred and permitted to steep overnight. Thereafter, the mixture was once more well mixed. This suspension possessed a weight proportion of about 68% Raney nickel as well as about 2.7% by weight of polytetrafluoroethylene and 0.5% by weight of polyethylene oxide. The suspension was flowed over into a tub-shaped vessel whose bottom had a semi-circularly shaped cross section, the radius of which was larger by about 1.5 cm. than that of the electrode disks to be coated.

B. Coating of the Electrode

The diffusion bodies to be coated consisted of a disk-shaped, nickel-plated plastic fiber framework of about 2.3 mm. thickness and a diameter of 8.65 cm. The porosity amounted approximately to 86%, the nickel plating 150 mg. per $cm^3$. The disks possessed a center hole of about 2 cm. diameter, at the edge of which a nickel plate lug was fastened which had a width of 1 cm. and pointed 0.6 cm. to the electrode center. These disks were placed over a shaft with a diameter of 2 cm. which possessed a longitudinal groove suitable for the accommodation of the nickel plate lug. The disk to be coated was now immersed into the suspension up to the shaft with a horizontally positioned shaft under slow rotation about the shaft (about 10 to 20 rpm). After a few rotations, the paste-laden substrate was lifted above the paste level, and the paste excess was centrifuged off approximately for 10 seconds at higher rotational speed. Depending on the rotational speed, the following catalyst coatings of the dried electrodes were obtained:

| Rotational Speed min.$^{-1}$ | Catalyst Coating mg. $cm^{-2}$ |
|---|---|
| 2,050 | 37.0 |
| 1,880 | 41.5 |
| 1,390 | 48.7 |
| 1,350 | 50.4 |
| 1,330 | 51.3 |

Polished sections of the finished electrodes indicated on both sides an identical layer thickness of about 220 micrometers and a penetration depth of the catalyst layer into the diffusion framework of about 20 micrometers each.

EXAMPLE 2

A. Manufacture of The Catalyst Suspension

According to the method described in Example 1, a catalyst suspension was made from 500 g Raney nickel with 22 $cm^3$ polytetrafluoroethylene dispersion, 262 $cm^3$ water and 3.75 g polyethylene oxide which contained 62.6% by weight of Raney nickel, about 2.4% by weight of polytetrafluoroethylene and about 0.45% by weight of polyethylene oxide.

B. Coating of The Substrate

Diffusion bodies as described in Example 1 were fastened on a shaft. With a vertically positioned shaft, the substrates were then immersed in the suspension. After about 5 seconds, the substrates were pulled out of the suspension, and at a rotational speed of 600 rpm, the excess in suspension was centrifuged off in about 3 seconds. The catalyst coating amounted on the average of 20 substrates to 62.2 mm. $cm^{-2}$ with a standard deviation of only 3.5%.

EXAMPLE 3

A. Manufacture of the Catalyst Suspension

The same suspension as in Example 2 was used.

B. Coating of the Electrode

With a vertically positioned shaft, substrates of different porosity were coated under identical conditions: Substrate contact with the paste 5 seconds, centrifuging duration 4 seconds, rotational speed 600 $min^{-1}$.

| Type | Framework Porosity % | Thickness mm. | Weight of the Coating In Relation To Area mg $cm^{-2}$ |
|---|---|---|---|
| I | (40) | 0.2 | 48.2 |
| II | 73 | 1.0 | 55.8 |
| III | 82 | 1.3 | 62.2 |
| IV | 85 | 1.8 | 63.3 |
| V | 90 | 1.5 | 67.4 |

Substrate I was a nickel-apertured plate with a free surface of about 40% and a hole diameter of 1.25 mm., substrate II was a sintered nickel plate for nickel-sintered foil electrodes, substrate III a nickel-plated plastic fiber framework, substrate IV a sintered nickel framework of nickel powder of large surface and substrate V a nickel fiber framework of high porosity which was pressed to about 50% of its original thickness.

While we have described several embodiments in accordance with the present invention, it is understood that this invention is not limited thereto but is susceptible to numerous changes and modifications as known to those skilled in the art, and we, therefore, do not wish to be limited to the examples described herein but intend to cover all such changes and modifications as are encompassed by the scope of the appended claims.

We claim:

1. A method for the manufacture of catalyst electrodes, in which a metallically conducting non-smooth electrode plate is treated with a paste binder-containing catalyst suspension and is subsequently dried, comprising the steps of applying to the surface of the electrode plate an excess of the catalyst suspension, and centrifuging off the excess by rotation of the electrode plate about an axis disposed at an angle to its surface to produce a porous catalyst layer coating.

2. A method according to claim 1, wherein said angle is substantially perpendicular to the surface of the electrode plate.

3. A method according to claim 1, wherein the coating takes place by contacting the surface of the suspension with the electrode plate surface to be coated, by immersion of the electrode plate into the suspension or by pouring the suspension on the surface of the carrier body.

4. A method according to claim 3, wherein the coating takes place by partial immersion into the suspension and slow rotation of the electrode plate arranged perpendicularly or at an inclination to the suspension surface.

5. A method according to claim 4, wherein the excess in suspension is maintained for about 2 to 10 seconds.

6. A method according to claim 5, wherein the excess of the suspension is centrifuged off at a rotational speed of about 200 to 2,000 $min^{-1}$ for about 2 to 10 seconds.

7. A method according to claim 6, wherein a metallically conducting fiber framework is used as electrode plate.

8. A method according to claim 1, wherein the excess in suspension is maintained for about 2 to 10 seconds.

9. A method according to claim 1, wherein the excess of the suspension is centrifuged off at a rotational speed of about 200 to 2,000 min$^{-1}$ for about 2 to 10 seconds.

10. A method according to claim 1, wherein a metallically conducting fiber framework is used as electrode plate.

11. A catalyst suspension comprising a binding agent, a catalyst and a suspension agent, the catalyst suspension having a dynamic viscosity of about 1,000 to 5,000 mPa s, in relation to a shear velocity of $D-1$ s$^{-1}$ and a temperature of 20° C. and a solids content of about 55 to about 75% by weight.

12. A suspension according to claim 11, wherein the suspension contains a binding agent having thickener qualities, wherein binding agent is methylcellulose, polyvinyl-pyrrolidone, polyethylene oxide or mixtures thereof.

13. A suspension according to claim 12, wherein the polyethylene oxide has a molecular weight of about 600,000 or greater.

14. A suspension according to claim 13, wherein the suspension contains Raney nickel as catalyst.

15. A suspension according to claim 14, wherein the Raney nickel is in depyrophorisized form.

16. A suspension according to claim 13, wherein the suspension agent is water and the suspension contains about 0.1 to about 2% by weight of binding agent, about 50 to about 73% by weight of depyrophorisized Raney nickel and about 2 to 5% by weight of polytetrafluoroethylene.

17. A suspension according to claim 11, wherein the suspension contains Raney nickel as catalyst.

18. A suspension according to claim 17, wherein the Raney nickel is in depyrophorisized form.

19. A suspension according to claim 11, wherein the suspension agent is water and the suspension contains about 0.1 to about 2% by weight of a binding having thickener qualities agent, about 50 to about 73% by weight of depyrophorisized Raney nickel and about 2 to 5% by weight of polytetrafluorothylene.

20. A suspension according to claim 19, wherein the suspension contains as binding agent, methycellulose, polyvinyl-pyrrolidone, polyethylene oxide or mixtures thereof.

21. A method of using a paste binder-containing catalyst suspension catalyst suspension to coat a non-smooth electrode plate for the manufacture of catalyst electrodes, in which the electrode plate is treated with the catalyst suspension and is subsequently dried, comprising the steps of:
(a) applying to a surface of the electrode plate an excess of the catalyst suspension, and
(b) centrifuging off the excess by rotation of the electrode plate about an axis disposed at an angel to its surface where the electrode plate has a porous catalyst layer coating.

22. A method according to claim 21, wherein said angle is substantially perpendicular to a surface of the electrode plate.

23. A method according to claim 21, wherein the coating takes place by contacting the surface of the suspension with the electrode plate surface to be coated, by immersion of the electrode plate into the suspension or by pouring the suspension on the surface of the electrode plate.

24. A method according to claim 23, wherein the coating takes place by partial immersion into the suspension and slow rotation of the electrode plate arranged perpendicularly or at an inclination to a suspension surface.

25. A method according to claim 24, wherein the excess in suspension is maintained for about 2 to 10 seconds.

26. A method according to claim 25, wherein the excess of the suspension is centrifuged off at a rotational speed of about 200 to 2,000 min$^{-1}$ for about 2 to 10 seconds.

27. A method according to claim 26, wherein a metallically conducting fiber framework is used as the electrode plate.

28. A method according to claim 21, wherein the excess in suspension is maintained for about 2 to 10 seconds.

29. A method according to claim 21, wherein the excess of the suspension is centrifuged off at a rotational speed of about 200 to 2,000 min$^{-1}$ for about 2 to 10 seconds.

30. A method according to claim 21, wherein a metallically conducting fiber framework is used as the electrode plate.

31. A method according to claim 21, wherein the catalyst suspension comprising a binding agent, a catalyst and a suspension agent, the catalyst suspension having a dynamic viscosity of about 1,000 to 5,000 mPa·s, in relation to a shear velocity of $D=1\cdot s^{-1}$ and a temperature of 20° C. and a solids content of about 55 to about 75% by weight.

32. A method according to claim 31, wherein the suspension contains Raney nickel as catalyst.

33. A method according to claim 32, wherein the Raney nickel is in depyrophorisized form.

34. A method according to claim 31, wherein the suspension agent is water and the suspension contains about 0.1 to about 2% by weight of the binding agent, about 50 to about 75% by weight of depyrophorisized Raney nickel as well as about 2 to 5% by weight of polytetrafluoroethylene.

35. A method according to claim 34, wherein the suspension contains as binding agent, methylcellulose, polyvinyl-pyrrolidone, polyethylene oxide or mixtures thereof.

36. A method according to claim 31, wherein the suspension contains a binding agent having thickener qualities, wherein the binding agent is methylcellulose, polyvinyl-pyrrolidone, polyethylene oxide or mixtures thereof.

37. A method according to claim 36, wherein the polyethylene oxide has a molecular weight of about 600,000 or greater.

38. A method according to claim 37, wherein the suspension contains Raney nickel as catalyst.

39. A method according to claim 38, wherein the Raney nickel is in depyrophorisized form.

40. A method according to claim 37, wherein the suspension agent is water and the suspension contains about 0.1 to about 2 weight of binding agent, about 50% to about 75% by weight of depyrophorisized Raney nickel and as about 2 to 5% by weight of polytetrafluoroethylene.n

* * * * *